United States Patent [19]
Draegert

[11] 3,750,045
[45] July 31, 1973

[54] LONGITUDINAL MODE STABILIZATION IN LASERS
[75] Inventor: David Allison Draegert, Madison, N.J.
[73] Assignee: Bell Telephone Laboratories, Inc., Murray Hill, N.J.
[22] Filed: June 1, 1971
[21] Appl. No.: 148,802

[52] U.S. Cl. .......................................... 331/94.5 C
[51] Int. Cl. .............................................. H01s 3/00
[58] Field of Search ................................... 331/94.5

[56] References Cited
UNITED STATES PATENTS
3,353,115  11/1967  Maiman .......................... 331/94.5

OTHER PUBLICATIONS
Mocker et al.: "Mode Competition and Self-Lock Effects in a Q-Switched Ruby Laser," Applied Physics Letters, vol. 7, pp 270–273, Nov. 15, 1965.

Goldsborough et al.: "Mode Discrimination in Self-Locking Cavity" IBM Q-Switched Disc. Bull., vol. 5, pg. 81, Oct. 1962. pp.

Primary Examiner—Edward S. Bauer
Attorney—W. L. Keefauver and Arthur J. Torsiglieri

[57] ABSTRACT

The longitudinal mode spectrum of a laser is simplified and stabilized by making the distance from each laser cavity mirror to the adjacent end of the laser medium an integral multiple of $x$, where $x$ is the optical path length of the medium.

4 Claims, 1 Drawing Figure

PATENTED JUL 31 1973
3,750,045
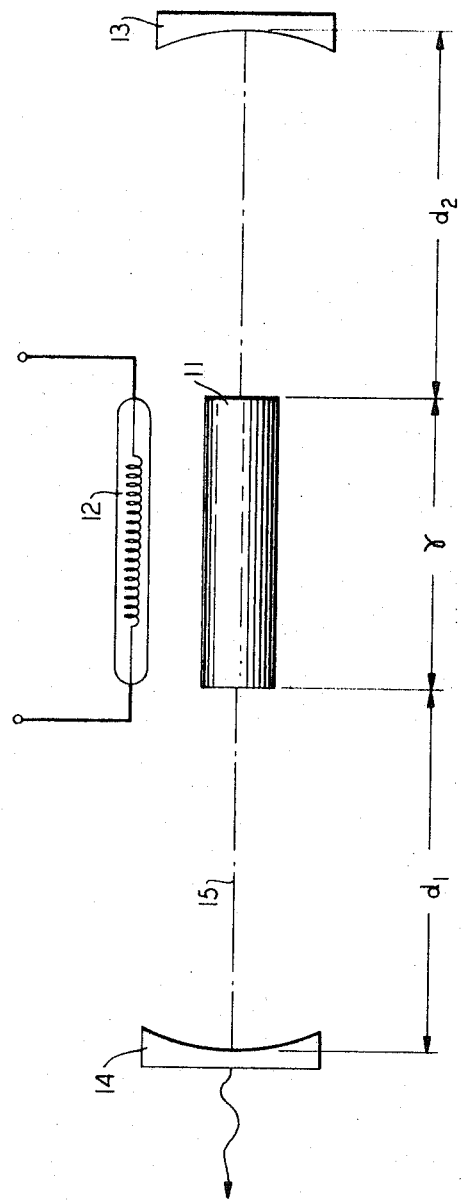
INVENTOR
D. A. DRAEGERT
BY
Roderick B Anderson
ATTORNEY

LONGITUDINAL MODE STABILIZATION IN LASERS

BACKGROUND OF THE INVENTION

This invention relates to laser stabilizing techniques, and more particularly, to techniques for stabilizing solid-state ion lasers.

As is known, the laser, or optical maser, is capable of generating and amplifying coherent light through the stimulated emission of radiation from an active laser medium. As used herein, the term "light" is intended to include infrared, ultra-violet, and any other frequencies to which the principles to be described are applicable. An important element of a laser, or at least a laser oscillator, is an optical cavity resonator for repeatedly directing the radiated light through the laser medium for cumulative gain.

The usual optical cavity resonator includes a pair of mirrors on opposite sides of the laser medium along the axis of the generated light beam. The cavity is resonant at frequencies equal to integral multiples of $C/2L$ where $C$ is the velocity of light and $L$ is the optical length of the cavity. Each resonant frequency corresponds to a longitudinal mode of the cavity. The device "gain-bandwidth," which refers to the optical frequency bandwidth over which the laser medium is capable of gain or amplification, may extend over an exceedingly large number of resonant frequencies.

Because the optical cavity is inherently resonant at many frequencies within the gain-bandwidth of the laser medium, the laser may oscillate at many different frequencies. This tendency is a troublesome source of laser instability, particularly in solid state ion lasers. Solid state ion lasers, also sometimes known as dielectric hose lasers, are lasers in which the active medium comprises a solid body doped with impurities such as to form ions that may be excited to a condition of population inversion. Population inversion is a fundamental requirement for any laser operation, and it refers to the production of an abnormally high proportion of high energy states within the active laser medium by an excitation mechanism known as pumping.

Laser mode instability problems generally become more pronounced as the number of oscillating modes of the laser cavity increases, because the various longitudinal modes compete for available energy. As a result, power levels in the various modes tend to fluctuate, thus giving a non-uniform and unpredictable light output.

SUMMARY OF THE INVENTION

It is an object of this invention to increase the stability of a laser.

It is another object of the invention to reduce the number of competing oscillating modes in solid-state ion lasers.

These and other objects of the invention are attained by making the optical path length from each mirror to the adjacent end of the laser medium an integral multiple of $x$, where $x$ is the optical path length of the medium and is equal to the product of the length and the index of refraction of the medium. As will be explained later, this reduces the number of oscillating modes and results in more uniform and predictable output power levels. Besides providing for a more stable output, the invention makes it easier to select a single output frequency because the dominant modes are more widely separated in terms of frequency than would otherwise be the case.

These and other objects, features, and advantages of the invention will be better understood by a consideration of the following detailed description taken in conjunction with the accompanying drawing which is a schematic illustration of a solid-state ion laser oscillator in accordance with an illustrative embodiment of the invention.

DETAILED DESCRIPTION

Referring now to the drawing, there is shown a solid-state ion laser comprising a laser rod 11, a pump source 12, and a laser cavity comprising mirrors 13 and 14 located along the axis 15 of the laser rod. Mirror 14 is partially transparent to permit the derivation of output light generated by the oscillator.

The laser oscillator may be a neodymium: yttrium-aluminum-garnet laser of the type described in the patent of Geusic et al. U.S. Pat. No. 3,252,103, granted May 17, 1966, and assigned to Bell Telephone Laboratories, Incorporated. As described in that patent, the pump source 12 and the laser rod 11 are preferably each located at a focal line of an elliptical cavity (not shown) so that light emitted from source 12 is effective in exciting component ions of laser rod 11 to a condition of population inversion. As is known, light emission at a characteristic frequency within the gain-bandwidth of the laser rod is stimulated by repeated reflection through the rod from mirrors 13 and 14.

As was explained before, numerous resonant modes of the optical cavity defined by mirrors 13 and 14 may lie within ghe gain-bandwidth of laser rod 11. This inherently leads to stability problems because the modes are sufficiently close in terms of gain to compete with each other for the available energy in the inverted population. In accordance with the invention, these stability problems are reduced or avoided by making the optical path between each of the mirrors and the adjacent laser medium ends an integral multiple of the optical path length of the laser medium. More specifically, the optical path lengths $d_1$ and $d_2$ shown on the drawing are each an integral multiple of $x$, where $x$ is the optical path length of the laser rod 11. It should be noted that the optical path length of any medium is equal to the product of its actual length and its index of refraction. If the optical path length $x$ of the laser rod 11 along the central axis 15 is A wavelengths long at the laser frequency of interest, then distances $d_1$ and $d_2$ are each an integral multiple of A wavelengths long at the same frequency of interest, such as 2A, 3A, 4A, etc., wavelengths long.

I have found that when the foregoing condition is met, the number of oscillating modes within the optical cavity is reduce and the power within each mode remains stable rather than fluctuating with time. Moreover, I have found that more than half of the modes are "strong" modes containing relatively high power, while the remainder are uniformly "weak" modes containing little power. This reduction in the number of modes without decreasing total power is particularly significant if the laser output is to be directed through nonlinear optical devices such as second harmonic generators.

While the mechanism for mode stabilization in accordance with the invention has not been rigorously established, a number of explanations are possible. Pairs of surfaces, such as the opposite end faces of the laser rod 11, and one rod face and one end mirror may constitute secondary optical cavities within the primary optical cavity defined by mirrors 13 and 14. The invention may provide strong coupling between the various cavities at resonant frequencies that are common to several or all cavities, thus causing these resonant modes to predominate over competing modes. Another possibility is that the invention may alter the effects of "spatial hole burning," a known phenomenon in which gain along the active medium fluctuates with distance. As a third explanation, the particular spacing of the invention may alter the effects of the optical absorption at the end surfaces of the laser rod. While the exact mechanism of stabilization is still a matter of conjecture, repeated experiments have demonstrated unequivocally that compliance with the condition described simplifies and stabilizes the laser spectrum.

A laser oscillator embodying the invention may typically comprise a yttrium-aluminum-garnet crystal containing about one percent neodymium as the laser rod 12. Pump source 12 may be a tungsten-iodine lamp with a 950 watt electrical input located in a 3 centimeter long elliptical cylinder. The laser rod 11 may have a diameter of 0.254 centimeters, a length of 3.43 centimeters, be coated with anti-reflection material in a known manner, and be located between mirrors 13 and 14, which may be spherical mirrors with radii of curvature of 1 meters. The line wavelength of the laser is approximately 1.0641 micrometers. The length L of the optical cavity in one experimental embodiment was 41 centimeters which represented an optical length equal to $7x$. Optical path lengths $d_1$ and $d_2$ were each equal to $3x$.

It has been found that with a laser of this type made in the conventional manner, up to 40 oscillating modes occur and, for the reasons given before, these modes are all unstable. With the invention, however, only ten oscillating modes occurred; and, of these, most of the optical laser output was contained within five uniformly-spaced strong laser modes.

The foregoing description is intended merely to be illustrative of the inventive concept involved and numerous other embodiments and modifications may be made by those skilled in the art without departing from the spirit and scope of the invention.

What is claimed is:

1. In a laser of the type comprising a laser medium located in an optical cavity comprising first and second mirrors arranged so as to reflect light back and forth along a central axis of the medium, the improvement wherein:
    the distance between the first mirror and the end of the medium nearest thereto, and the distance between the second mirror and the end of the medium nearest thereto is each substantially equal to an integral multiple of $x$, where $x$ is the optical path length of the medium along the central axis.

2. The improvement of claim 1 wherein the laser medium is a solid body doped with impurities such as to form ions that may be excited to a condition of population inversion.

3. The improvement of claim 2 wherein the laser medium has flat ends which are substantially perpendicular to the central axis.

4. The improvement of claim 1 wherein the laser medium is a crystal body of yttrium-aluminum garnet doped with neodymium.

* * * * *